(12) United States Patent
Navale

(10) Patent No.: US 8,464,756 B2
(45) Date of Patent: Jun. 18, 2013

(54) SPOOL VALVE

(75) Inventor: Rahul L. Navale, Plymouth, MN (US)

(73) Assignee: Eaton Corporation, Cleveland, OH (US)

( * ) Notice: Subject to any disclaimer, the term of this patent is extended or adjusted under 35 U.S.C. 154(b) by 653 days.

(21) Appl. No.: 12/564,071

(22) Filed: Sep. 22, 2009

(65) Prior Publication Data

US 2011/0067771 A1     Mar. 24, 2011

(51) Int. Cl.
*F16K 11/07* (2006.01)

(52) U.S. Cl.
USPC ................................ 137/625.69; 137/625.67

(58) Field of Classification Search
USPC ............. 137/625.96, 625.65, 625.66, 625.64, 137/596–596.2, 625.69
See application file for complete search history.

(56) References Cited

U.S. PATENT DOCUMENTS

| | | | | |
|---|---|---|---|---|
| 2,949,097 | A * | 8/1960 | Vander Kaay | 137/625.68 |
| 4,220,178 | A * | 9/1980 | Jackson | 137/625.3 |
| 4,368,872 | A * | 1/1983 | Machat | 251/63 |
| 4,388,949 | A * | 6/1983 | Bonney | 137/625.17 |
| 4,941,508 | A * | 7/1990 | Hennessy et al. | 137/625.69 |
| 5,193,584 | A | 3/1993 | Watts | |
| 6,810,912 | B2 | 11/2004 | Ogura et al. | |
| 6,966,340 | B2 * | 11/2005 | Lee | 137/625.69 |
| 2005/0224115 | A1 | 10/2005 | Lun-Jung | |
| 2008/0202608 | A1 * | 8/2008 | Tschida et al. | 137/554 |

FOREIGN PATENT DOCUMENTS

| | | |
|---|---|---|
| CN | 2194992 Y | 4/1995 |
| CN | 2283160 Y | 6/1998 |
| CN | 1346941 A | 5/2002 |
| CN | 1013887310 A | 3/2009 |
| DE | 2730431 A1 | 1/1979 |
| DE | 19938884 A1 | 2/2001 |
| GB | 2065010 A | 6/1981 |
| JP | 9089136 A | 3/1997 |

OTHER PUBLICATIONS

Written Opinion of International Searching Authority for corresponding PCT Application.

* cited by examiner

*Primary Examiner* — Craig Schneider
*Assistant Examiner* — Seth Faulb
(74) *Attorney, Agent, or Firm* — Quinn Law Group, PLLC

(57) ABSTRACT

A spool valve includes a housing defining a bore that extends along a longitudinal axis. A spool is disposed within the bore and is moveable between a first position for directing a hydraulic fluid along a first flow path and a second position for directing the hydraulic fluid along a second flow path. The spool includes a supply portion disposed between a first land portion and a second land portion. The supply portion includes an outer surface that defines a truncated pseudosphere for smoothly directing the flow of the hydraulic fluid across the surface of the spool.

15 Claims, 4 Drawing Sheets

SPOOL VALVE

TECHNICAL FIELD

The invention generally relates to a spool valve for controlling the direction of a flow of a hydraulic fluid, and more specifically to spool for the spool valve.

BACKGROUND OF THE INVENTION

Spool valves control, i.e., switch, the direction of flow of a hydraulic fluid by moving a spool axially along a longitudinal axis within a bore of a valve housing between at least a first position and a second position. Movement of the spool opens and/or closes fluid communication between various ports defined by the valve housing to direct the hydraulic fluid along at least one of a first flow path and a second flow path.

The spool includes multiple land portions that each include a diameter substantially equal to a diameter of the bore within which the spool is disposed. The land portions are each configured for sealing against the bore. The various land portions define therebetween multiple fluid directing portions. The fluid directing portions are in fluid communication with the various ports defined by the valve housing, and are sealed from each other by the various land portions. The fluid directing portions cooperate with the bore to define fluid chambers, through which the hydraulic fluid flows from one port to another.

In operation, the hydraulic fluid flows from the various ports into the fluid chambers, and flows along an outer surface of the various fluid directing portions of the spool. Accordingly, the shape of the outer surface of the fluid directing portions of the spool directly affects the flow characteristics of the hydraulic fluid flowing through the fluid chambers.

SUMMARY OF THE INVENTION

In one aspect of the invention, a spool valve is disclosed. The spool valve includes a housing, which defines a bore extending along a longitudinal axis. The housing further defines a supply port, a first load port, a second load port and at least one exhaust port. The supply port is in fluid communication with the bore and is configured for supplying a hydraulic fluid to the bore. The first load port is in fluid communication with the bore and is configured for directing the hydraulic fluid along a first flow path. The second load port is in fluid communication with the bore and is configured for directing the hydraulic fluid along a second flow path. The at least one exhaust port is in fluid communication with the bore and is configured for exhausting the hydraulic fluid from the housing. A spool is disposed within said bore and moveable between at least a first position and a second position. The first position opens fluid communication between the supply port and the first load port, opens fluid communication between the second load port and the at least one exhaust port, and closes fluid communication between the supply port and the second load port. The second position opens fluid communication between the supply port and the second load port, opens fluid communication between the first load port and the at least one exhaust port, and closes fluid communication between the supply port and the first load port. The spool includes a supply portion disposed axially along the longitudinal axis between a first land portion and a second land portion. The supply portion defines a truncated pseudosphere configured for directing the hydraulic fluid to the first load port when the spool is in the first position and configured for directing the hydraulic fluid to the second load port when the spool is in the second position.

In another aspect of the invention, a spool for a spool valve is disclosed. The spool includes a first end and a second end spaced along a longitudinal axis from the first end. A first land portion, a second land portion, a third land portion disposed between the first end and the first land portion and a fourth land portion disposed between the second land portion and the second end. Each of the first land portion, the second land portion, the third land portion and the fourth land portion are configured for sealing against a bore of a valve housing. A supply portion is disposed axially along the longitudinal axis between the first land portion and the second land portion. A first return portion is disposed axially along the longitudinal axis between the third land portion and the first land portion. A second return portion disposed axially along the longitudinal axis between the fourth land portion and the second land portion. The supply portion defines a truncated pseudosphere configured for selectively directing a hydraulic fluid to one of a first load port and a second load port of the valve housing.

Accordingly, the shape of the spool, and more specifically the shape of the supply portion of the spool, smoothly directs the flow of the hydraulic fluid from the supply port to one of the first load port and the second load port, which reduces a hydraulic force generated by the hydraulic fluid that acts on the spool. Reducing the hydraulic force acting on the spool allows the spool to be moved with less effort.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
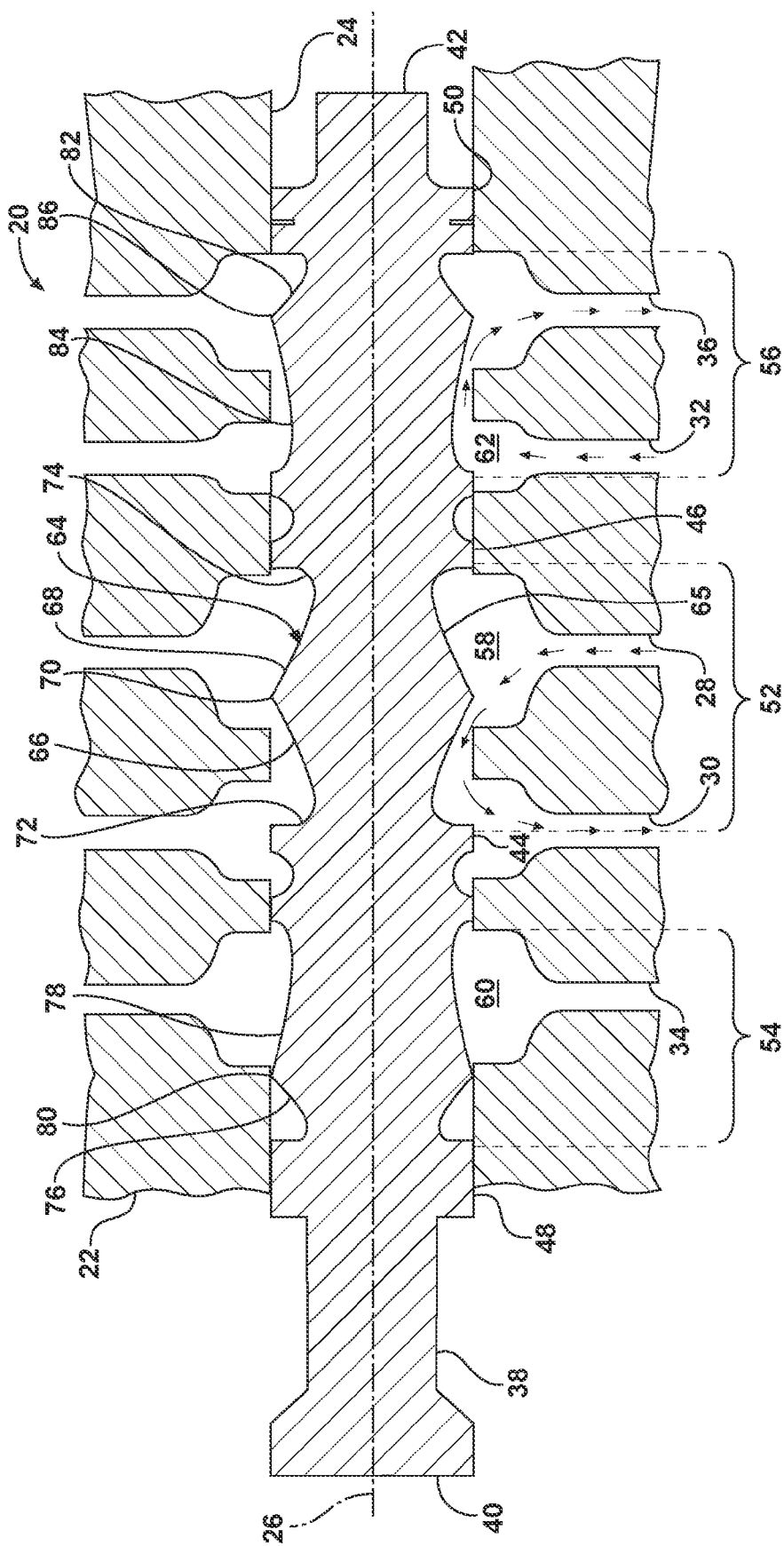
FIG. 1 is a schematic cross sectional view of a spool valve showing a first embodiment of a spool in a first position.
Figure 2:
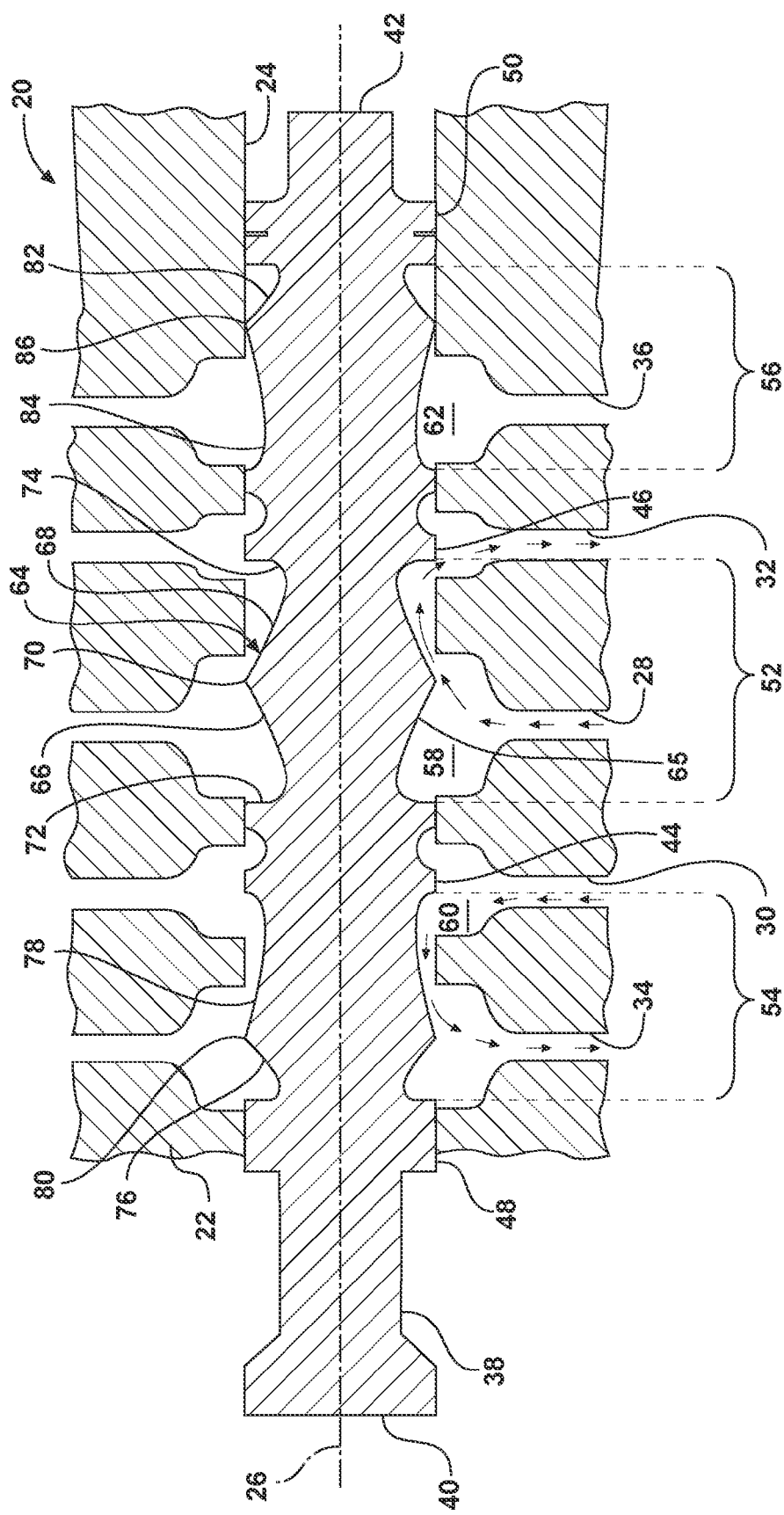
FIG. 2 is a schematic cross sectional view of the spool valve showing the first embodiment of the spool in a second position.

Referring to FIGS. 1 and 2, wherein like numerals indicate like parts throughout the several views, a spool valve is shown generally at 20. The spool valve 20 directs a flow of a hydraulic fluid along at least one of a first flow path, shown in FIG. 1, and a second flow path, shown in FIG. 2.

The spool valve 20 is part of a hydraulic system. The hydraulic system may include a pump (not shown) for pressurizing and circulating the hydraulic fluid, the spool valve 20 for directing the flow of the hydraulic fluid, a motor (not shown) for converting the flow of pressurized hydraulic fluid into work, and a tank (not shown) for storing excess hydraulic fluid and circulating the hydraulic fluid back to the pump.

The spool valve 20 includes a housing 22. The housing 22 defines a bore 24, which extends along a longitudinal axis 26. The housing 22 may be configured in any suitable manner for the specific situation for which it is intended. Accordingly, it should be appreciated that the housing 22 may be configured and/or shaped differently than shown. As shown, the housing 22 further defines a supply port 28, a first load port 30, a second load port 32 and at least one exhaust port, 34, 36. The supply port 28 is in fluid communication with the bore 24, and is configured for supplying the hydraulic fluid to the bore 24. The first load port 30 is in fluid communication with the bore 24, and is configured for directing the hydraulic fluid from the bore 24, along the first flow path. The second load port 32 in is fluid communication with the bore 24, and is configured for directing the hydraulic fluid from the bore 24, along the second flow path. The at least one exhaust port 34, 36 is in fluid communication with the bore 24, and is configured for exhausting the hydraulic fluid from the housing 22 for return back to the tank. As shown, the at least one exhaust port includes a first exhaust port 34 and a second exhaust port 36.

The spool valve 20 includes a spool 38, which is moveably disposed within the bore 24. The spool 38 is moveable between at least a first position, shown in FIG. 1, and a second position, shown in FIG. 2. The first position opens fluid communication between the supply port 28 and the first load port 30, opens fluid communication between the second load port 32 and the second exhaust port 36, and closes fluid communication between the supply port 28 and the second load port 32. The second position opens fluid communication between the supply port 28 and the second load port 32, opens fluid communication between the first load port 30 and the first exhaust port 34, and closes fluid communication between the supply port 28 and the first load port 30. It should be appreciated that the housing 22 and spool 38 may be configured differently than shown, and that the first position and the second position may operate to open and/or close fluid communication in a sequence different than shown or described herein.

The spool 38 includes a first end 40 and a second end 42. The second end 42 is spaced along the longitudinal axis 26 from the first end 40. As shown, the spool 38 further includes a first land portion 44, a second land portion 46, a third land portion 48 and a fourth land portion 50. The first land portion 44 and the second land portion 46 are disposed near an approximate middle of the spool 38, with the first land portion 44 disposed nearer the first end 40 than the second end 42, and the second land portion 46 disposed nearer the second end 42 than the first end 40. The third land portion 48 is disposed between the first end 40 and the first land portion 44. The fourth land portion 50 is disposed between the second land portion 46 and the second end 42.

Each of the first land portion 44, the second land portion 46, the third land portion 48 and the fourth land portion 50 include a diameter that is substantially equal to a diameter defined by the bore 24. Additionally, each of the first land portion 44, the second land portion 46, the third land portion 48 and the fourth land portion 50 are configured for sealing against the bore 24.

The spool 38 further includes a supply portion 52, a first return portion 54 and a second return portion 56. The supply portion 52 cooperates with the bore 24 to define a supply chamber 58 therebetween, into which the hydraulic fluid is directed from the pump. The first return portion 54 cooperates with the bore 24 to define a first chamber 60. The second return portion 56 cooperates with the bore 24 to define a second chamber 62.

The supply portion 52 is disposed axially along the longitudinal axis 26 between the first land portion 44 and the second land portion 46, and is disposed nearer an approximate midsection of the spool 38. As shown in FIG. 1, the first return portion 54 is disposed to the left of the supply portion 52 between the supply portion 52 and the first end 40. More specifically, the first return portion 54 is disposed between the third land portion 48 and the first land portion 44. As shown in FIG. 1, the second return portion 56 is disposed to the right of the supply portion 52 between the supply portion 52 and the second end 42. More specifically, the second return portion 56 is disposed between the second land portion 46 and the fourth land portion 50.

At least part of the supply portion 52 defines a truncated pseudosphere 64. As is known, a pseudosphere is commonly defined as a constant negative surface generated by revolving a tractrix about its asymptote. The truncated pseudosphere 64 includes the shape of a pseudosphere with the opposing distal ends truncated. The truncated pseudosphere 64 is centered at a midsection of the supply portion 52. The truncated pseudosphere 64 includes a first half 66 that is configured for directing the hydraulic fluid to the first load port 30 when the spool 38 is in the first position, and includes a second half 68 that is configured for directing the hydraulic fluid to the second load port 32 when the spool 38 is in the second position.

As described above, the truncated pseudosphere 64 includes an outer surface 65 having a constant negative curvature. Additionally, the first half 66 of the truncated pseudosphere 64 defines a first inverse radius (1/R) and the second half 68 of the truncated pseudosphere 64 defines a second inverse radius (1/R). The first inverse radius is equal to the second inverse radius.

Figure 4:
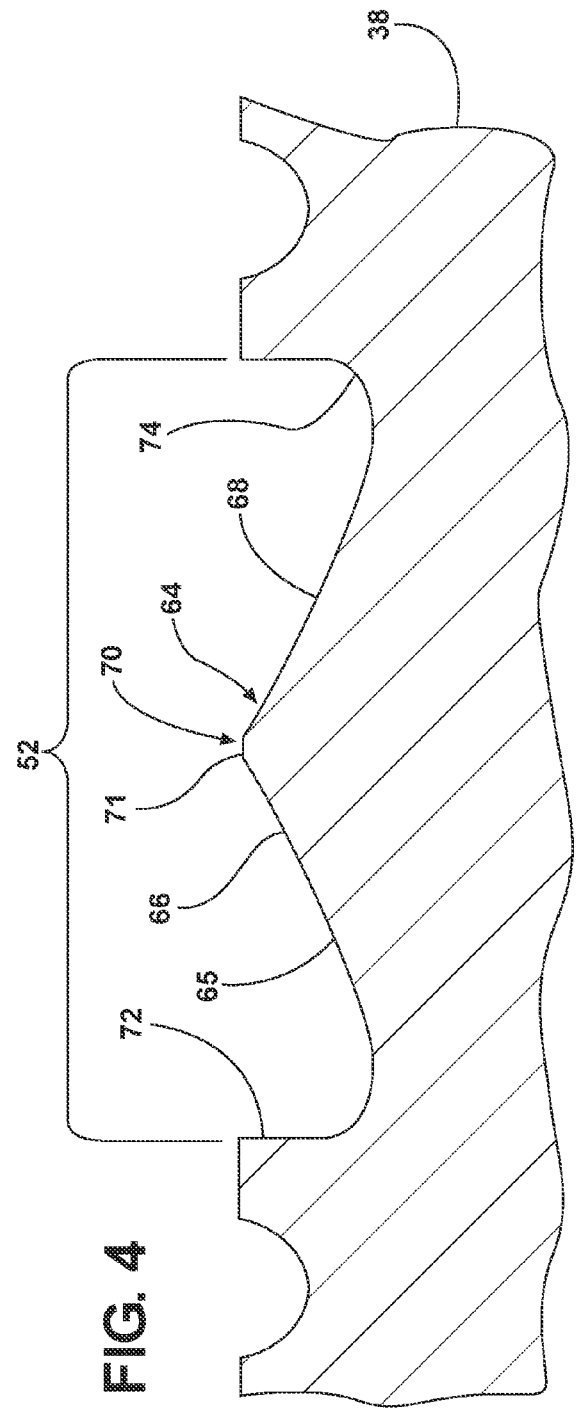
FIG. 4 is an enlarged fragmentary schematic cross sectional view of the first embodiment of the spool.
Figure 5:
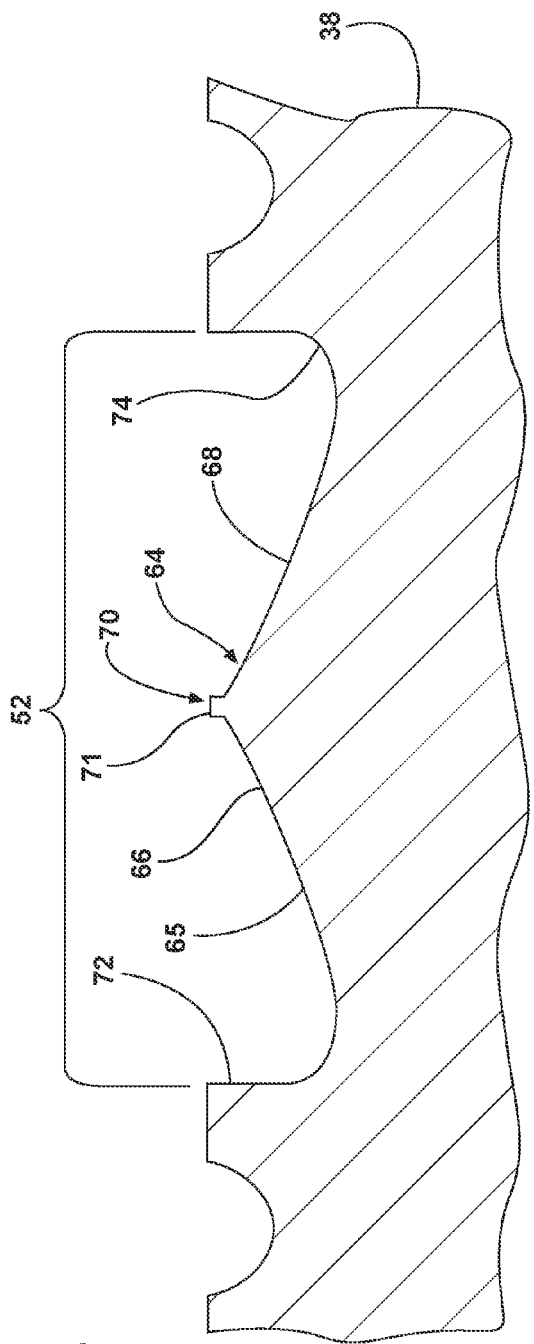
FIG. 5 is an enlarged fragmentary schematic cross sectional view of a second alternative embodiment of the spool.
Figure 6:
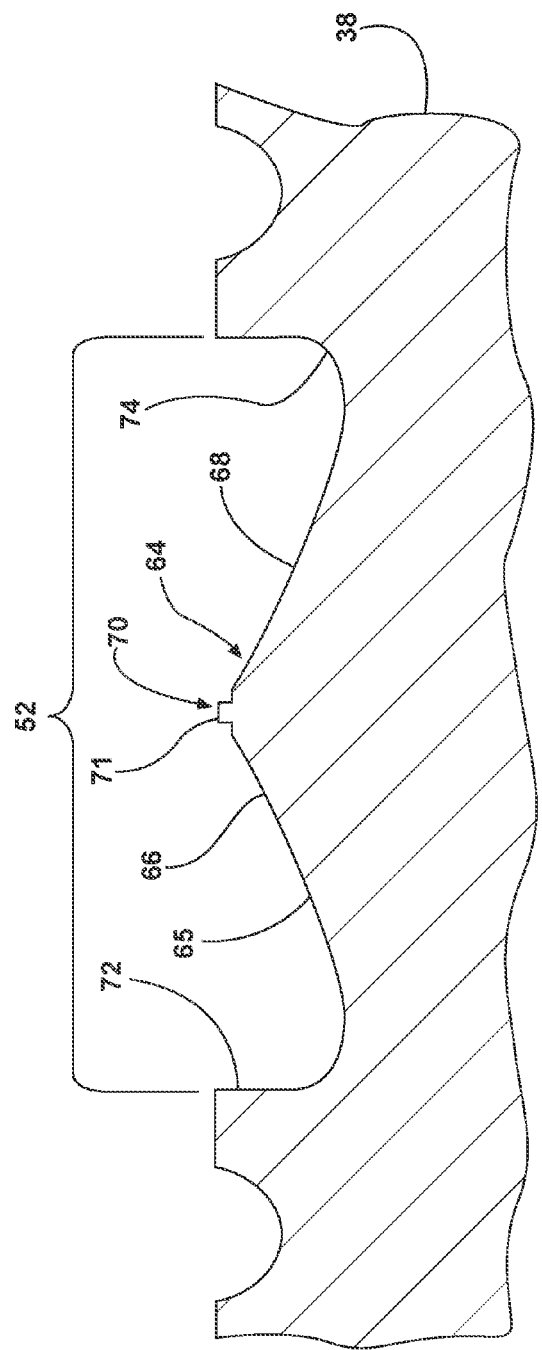
FIG. 6 is an enlarged fragmentary schematic cross sectional view of a third alternative embodiment of the spool.

The truncated pseudosphere 64 includes a ridge 70, which is disposed at the midsection of the supply portion 52. Due to the scale of FIGS. 1 and 2, the ridge 70 is shown in cross section as a point, and therefore is shown defining an annular linear ring extending about a periphery of the spool 38. However, referring to FIG. 4, the ridge 70 may define a flat face 71, which extends along the longitudinal axis a pre-determined distance. Referring also to FIGS. 5 and 6, alternative embodiments of the ridge 70 are shown. The pre-determined distance may include any distance suitable to permit manufacture and measurement of the diameter of the ridge 70. The first half 66 and the second half 68 of the truncated pseudosphere 64 are mirror images of each other, mirrored across the ridge 70, perpendicular to the longitudinal axis 26 and are symmetrically disposed about the midsection of the supply portion 52. The ridge 70 includes a diameter that is greater than a diameter defined by any other section of the truncated pseudosphere 64. In other words, the diameter of the ridge 70 is the largest diameter defined by the truncated pseudosphere 64.

The supply portion 52 further includes a first curve portion 72 and a second curve portion 74. The first curve portion 72 is disposed axially along the longitudinal axis 26 between the first half 66 of the truncated pseudosphere 64 and the first land portion 44. The first curve portion 72 defines a diameter that continuously decreases in size along the longitudinal axis 26, when measured in a direction moving from the first land portion 44 toward the first half 66 of the truncated pseudosphere 64. The second curve portion 74 is disposed axially along the longitudinal axis 26 between the second half 68 of the truncated pseudosphere 64 and the second land portion 46. The second curve portion 74 defines a diameter that continuously decreases in size along the longitudinal axis 26, when measured in a direction moving from the second land portion 46 toward the second half 68 of the truncated pseudosphere 64. Accordingly, it should be appreciated that the length of the supply portion 52 of the spool 38 along the longitudinal axis 26 includes the first curve portion 72, the truncated pseudosphere 64 and the second curve portion 74. Additionally, it should be appreciated that the diameter of the supply portion 52 when measured in a direction moving from the first land portion 44 toward the second land portion 46 decreases in size along the first curve portion 72, increases in size along the first half 66 of the truncated pseudosphere 64, decreases in size along the second half 68 of the truncated pseudosphere 64 and increases in size along the second curve portion 74.

The first return portion 54 is configured for directing the hydraulic fluid from the first load port 30 to the at least one exhaust port when the spool 38 is in the second position. More specifically, the first return portion 54 is configured for directing the hydraulic fluid from the first load port 30 to the first exhaust port 34.

The first return portion 54 includes a first outer portion 76, a first inner portion 78 and a first annular crest 80. The first annular crest 80 is disposed between the first inner portion 78 and the first outer portion 76. The first outer portion 76 includes a continuously increasing diameter along the longitudinal axis 26 when measured along the longitudinal axis 26 in a direction from the third land portion 48 toward the first annular crest 80. The first inner portion 78 includes a continuously decreasing diameter when measured along the longitudinal axis 26 in a direction from the first annular crest 80 toward the first land portion 44. Accordingly, the first inner portion 78 and the first outer portion 76 each include a rate of diametric change, i.e., a rate of change of the diameter of the first inner portion 78 and the first outer portion 76 respectively, measured along the longitudinal axis 26. The rate of diametric change of the first outer portion 76 along the longitudinal axis 26 greater than the rate of diametric change of the first inner portion 78. In other words, the diameter of the first outer portion 76 decreases in size at a faster rate than the first inner portion 78 when measured over a common distance along the longitudinal axis 26.

The first return portion 54 and the second return portion 56 are mirror images of each other, mirrored across the midsection of the supply portion 52, i.e., the ridge 70 of the supply portion 52, transverse to the longitudinal axis 26. Accordingly, the first return portion 54 and the second return portion 56 are symmetrical relative to each other about the midsection of the supply portion 52.

The second return portion 56 is configured for directing the hydraulic fluid from the second load port 32 to the at least one exhaust port when the spool 38 is in the first position. More specifically, the second return portion 56 is configured for directing the hydraulic fluid from the second load port 32 to the second exhaust port 36.

The second return portion 56 includes a second outer portion 82, a second inner portion 84 and a second annular crest 86. The second annular crest 86 is disposed between the second inner portion 84 and the second outer portion 82. The second outer portion 82 includes a continuously increasing diameter along the longitudinal axis 26 when measured along the longitudinal axis 26 in a direction from the fourth land portion 50 toward the second annular crest 86. The second inner portion 84 includes a continuously decreasing diameter when measured along the longitudinal axis 26 in a direction from the second annular crest 86 toward the second land portion 46. Accordingly, the second inner portion 84 and the second outer portion 82 each include a rate of diametric change, i.e., a rate of change of the diameter of the second inner portion 84 and the second outer portion 82 respectively, measured along the longitudinal axis 26. The rate of diametric change of the second outer portion 82 along the longitudinal axis 26 is greater than the rate of diametric change of the second inner portion 84. In other words, the diameter of the second outer portion 82 decreases in size at a faster rate than the second inner portion 84 when measured over a common distance along the longitudinal axis 26.

Figure 3:
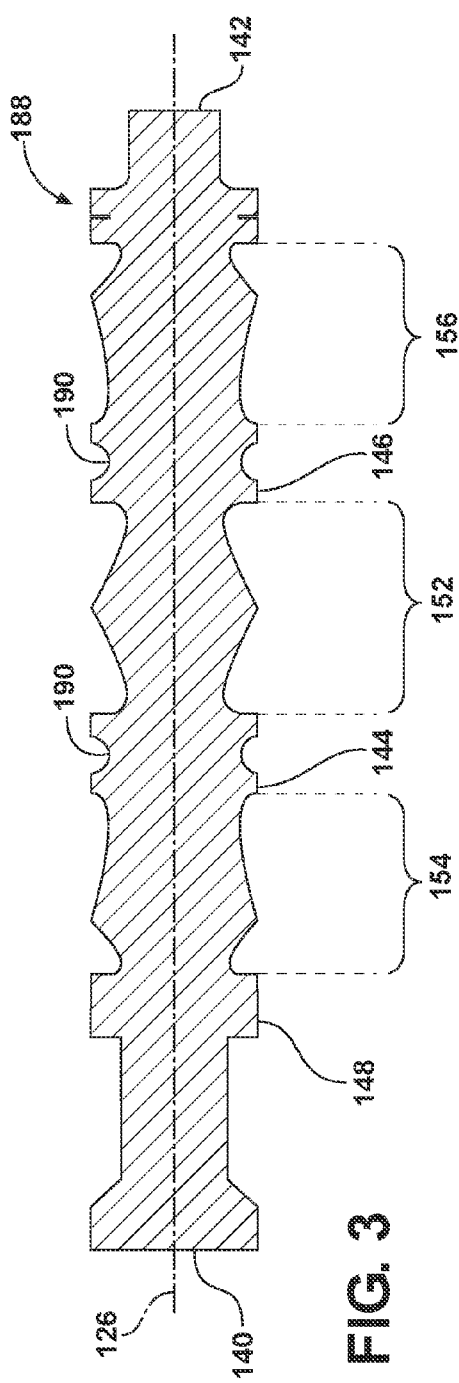
FIG. 3 is a schematic cross sectional view of an alternative embodiment of the spool.

Referring to FIG. 3, an alternative embodiment of the spool is shown generally at 188. Elements of the alternative embodiment of the spool 188 that are identical to the elements of the first embodiment of the spool 38, described above, are identified by the same reference numeral increased by one hundred. For example, the first land portion, identified by the reference numeral 44 in the first embodiment of the spool 38 is identified by the reference numeral 144 in the alternative embodiment of the spool 188, the first end, identified by the reference numeral 40 in the first embodiment of the spool 38 is identified by the reference numeral 140 in the alternative embodiment of the spool 188, the second end, identified by the reference numeral 42 in the first embodiment of the spool 38 is identified by the reference numeral 142 in the alternative embodiment of the spool 188, and the third land portion, identified by the reference numeral 48 in the first embodiment of the spool 38 is identified by the reference numeral 148 in the alternative embodiment of the spool 188.

Within the alternative embodiment of the spool 188, the first land portion 144 and the second land portion 146 each include a transverse annular channel 190. The transverse annular channel 190 of each of the first land portion 144 and the second land portion 146 includes a variable diameter that is less than the diameter of the bore 24, and is generally defined by rotating a semi-spherical concave surface about the longitudinal axis 22 of the spool 38.

While the best modes for carrying out the invention have been described in detail, those familiar with the art to which this invention relates will recognize various alternative designs and embodiments for practicing the invention within the scope of the appended claims.

The invention claimed is:

1. A spool valve comprising:
a housing defining a bore extending along a longitudinal axis, a supply port in fluid communication with said bore and configured for supplying a hydraulic fluid to said bore, a first load port in fluid communication with said bore and configured for directing the hydraulic fluid along a first flow path, a second load port in fluid communication with said bore and configured for directing the hydraulic fluid along a second flow path, and at least one exhaust port in fluid communication with said bore and configured for exhausting the hydraulic fluid from said housing; and
a spool disposed within said bore and moveable between at least a first position and a second position, wherein said first position opens fluid communication between said supply port and said first load port, opens fluid communication between said second load port and said at least one exhaust port, and closes fluid communication between said supply port and said second load port, and wherein said second position opens fluid communication between said supply port and said second load port, opens fluid communication between said first load port and said at least one exhaust port, and closes fluid communication between said supply port and said first load port;
said spool having a first land portion and a second land portion, and including a supply portion disposed axially along said longitudinal axis between the first land portion and the second land portion, said supply portion defining a truncated pseudosphere configured for directing the hydraulic fluid to said first load port when said spool is in said first position and directing the hydraulic fluid to said second load port when said spool is in said second position;

wherein the truncated pseudosphere includes a ridge disposed at a midsection of the supply portion;

wherein the truncated pseudosphere includes a first half and a second half disposed on opposite sides of the ridge;

wherein the supply portion includes a first curve portion disposed between the first half of the truncated pseudosphere and the first land portion, the first curve portion defining a diameter continuously decreasing in size along the longitudinal axis from the first land portion to the first half of the truncated pseudosphere, wherein the first curve portion cooperates with the first half of the truncated pseudosphere to direct the hydraulic fluid from the supply port to the first load port when the spool is in the first position; and wherein the supply portion includes a second curve portion disposed between the second half of the truncated pseudosphere and the second land portion, the second curve portion defining a diameter continuously decreasing in size along the longitudinal axis from the second land portion to the second half of the truncated pseudosphere, wherein the second curve portion cooperates with the second half of the truncated pseudosphere to direct the hydraulic fluid from the supply port to the second load port when the spool is in the second position.

2. A spool valve as set forth in claim 1 wherein said first half of said truncated pseudosphere defines a first inverse radius and said second half of said truncated pseudosphere defines a second inverse radius with said first inverse radius equal to said second inverse radius.

3. A spool valve as set forth in claim 1 wherein said first land portion and said second land portion each include a transverse annular channel having a variable diameter that is less than a diameter of the bore.

4. A spool valve as set forth in claim 1 wherein said truncated pseudosphere defines a surface having a constant negative curvature.

5. A spool valve as set forth in claim 4 wherein said ridge includes a diameter greater than a diameter defined by any other section of said truncated pseudosphere.

6. A spool valve as set forth in claim 1 wherein said spool includes a first end, a third land portion disposed between said first end and said first land portion and a first return portion disposed between said third land portion and said first land portion, said first return portion configured for directing the hydraulic fluid from said first load port to said at least one exhaust port when said spool is in said second position.

7. A spool valve as set forth in claim 6 wherein said spool includes a second end, a fourth land portion disposed between said second end and said second land portion and a second return portion disposed between said fourth land portion and said second land portion, said second return portion configured for directing the hydraulic fluid from said second load port to said at least one exhaust port when said spool is in said first position.

8. A spool valve as set forth in claim 7 wherein said first return portion includes a first outer portion, a first inner portion and a first annular crest disposed between said first inner portion and said first outer portion, wherein said first outer portion includes a continuously increasing diameter along said longitudinal axis from said third land portion to said first annular crest and said first inner portion includes a continuously decreasing diameter along said longitudinal axis from said first annular crest to said first land portion.

9. A spool valve as set forth in claim 7 wherein said second return portion includes a second outer portion, a second inner portion and a second annular crest disposed between said second inner portion and said second outer portion, wherein said second outer portion includes a continuously increasing diameter along said longitudinal axis from said fourth land portion to said second annular crest and said second inner portion includes a continuously decreasing diameter along said longitudinal axis from said second annular crest to said second land portion.

10. A spool valve as set forth in claim 7 wherein said first return portion is symmetrical with said second return portion about a midsection of said supply portion.

11. A spool for a spool valve, the spool comprising:

a first end and a second end spaced along a longitudinal axis from said first end;

a first land portion, a second land portion, a third land portion disposed between said first end and said first land portion and a fourth land portion disposed between said second land portion and said second end, each of said first land portion, said second land portion, said third land portion and said fourth land portion configured for sealing against a bore of a valve housing;

a supply portion disposed axially along said longitudinal axis between said first land portion and said second land portion;

a first return portion disposed axially along said longitudinal axis between said third land portion and said first land portion; and a second return portion disposed axially along said longitudinal axis between said fourth land portion and said second land portion;

wherein said supply portion defines a truncated pseudosphere configured for selectively directing a hydraulic fluid;

wherein the truncated pseudosphere includes a ridge disposed at a midsection of the supply portion;

wherein the truncated pseudosphere includes a first half and a second half disposed on opposite sides of the ridge;

wherein the supply portion includes a first curve portion disposed between the first half of the truncated pseudosphere and the first land portion, the first curve portion defining a diameter continuously decreasing in size along the longitudinal axis from the first land portion to the first half of the truncated pseudosphere, wherein the first curve portion cooperates with the first half of the truncated pseudosphere to direct the hydraulic fluid from the supply port to the first load port when the spool is in the first position; and wherein the supply portion includes a second curve portion disposed between the second half of the truncated pseudosphere and the second land portion, the second curve portion defining a diameter continuously decreasing in size along the longitudinal axis from the second land portion to the second half of the truncated pseudosphere, wherein the second curve portion cooperates with the second half of the truncated pseudosphere to direct the hydraulic fluid from the supply port to the second load port when the spool is in the second position.

12. A spool as set forth in claim 11 wherein said first return portion includes a first outer portion, a first inner portion and a first annular crest disposed between said first inner portion and said first outer portion, wherein said second return portion includes a second outer portion, a second inner portion and a second annular crest disposed between said second inner portion and said second outer portion, wherein said first outer portion includes a continuously increasing diameter along said longitudinal axis from said third land portion to said first annular crest and said first inner portion includes a continuously decreasing diameter along said longitudinal axis from said first annular crest to said first land portion, and wherein said second outer portion includes a continuously increasing diameter along said longitudinal axis from said fourth land portion to said second annular crest and said second inner portion includes a continuously decreasing diameter along said longitudinal axis from said second annular crest to said second land portion.

13. A spool as set forth in claim 11 wherein said truncated pseudosphere defines a surface having a constant negative curvature.

14. A spool as set forth in claim 13 wherein said ridge includes a diameter greater than a diameter defined by any other section of said truncated pseudosphere.

15. A spool as set forth in claim 14 wherein said first half of said truncated pseudosphere defines a first inverse radius and said second half of said truncated pseudosphere defines a second inverse radius with said first inverse radius equal to said second inverse radius.

* * * * *